US012708846B2

(12) United States Patent
Benedetto et al.

(10) Patent No.: US 12,708,846 B2
(45) Date of Patent: Aug. 18, 2026

(54) USING GAME STATE DATA FOR SEMANTIC UNDERSTANDING BY AN AI IMAGE GENERATION MODEL

(71) Applicant: Sony Interactive Entertainment Inc., Tokyo (JP)

(72) Inventors: Warren Benedetto, Foothill Ranch, CA (US); Arran Green, San Diego, CA (US); Rebecca Abel, Longmont, CO (US); Jon Webb, San Mateo, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 351 days.

(21) Appl. No.: 18/095,507

(22) Filed: Jan. 10, 2023

(65) Prior Publication Data

US 2024/0226734 A1 Jul. 11, 2024

(51) Int. Cl.

*A63F 13/52* (2014.01)
*A63F 13/77* (2014.01)
*G06T 15/20* (2011.01)
*G06T 19/20* (2011.01)
*G06F 3/04845* (2022.01)

(52) U.S. Cl.

CPC .............. *A63F 13/52* (2014.09); *A63F 13/77* (2014.09); *G06T 15/20* (2013.01); *G06T 19/20* (2013.01); *G06F 3/04845* (2013.01); *G06T 2200/24* (2013.01); *G06T 2219/2004* (2013.01)

(58) Field of Classification Search

CPC ...... A63F 13/217; A63F 13/355; A63F 13/45; A63F 13/52; A63F 13/67; A63F 13/77; G06T 15/20; G06T 19/20; G06T 2200/24; G06T 2219/2004; G06F 3/04845

See application file for complete search history.

(56) References Cited

U.S. PATENT DOCUMENTS

2019/0244137 A1* 8/2019 Malan .................... G06N 20/00
2019/0354759 A1 11/2019 Somers et al.

(Continued)

FOREIGN PATENT DOCUMENTS

WO 2019073267 A1 4/2019

OTHER PUBLICATIONS

PCT/US2023/085483 Notification of Transmittal of the International Search Report and the Written Opinion of the International Searching Authority, or the Declaration, PCT/ISA/220, and the International Search Report, PCT/ISA/210, Apr. 26, 2024.

*Primary Examiner* — Omkar A Deodhar

(74) *Attorney, Agent, or Firm* — Kilpatrick Townsend & Stockton LLP

(57) ABSTRACT

A method is provided, including: receiving a game image, said game image being captured from gameplay of a video game and said game image depicting a scene of the video game; receiving game state data describing attributes of the scene of the video game that is depicted in the game image; receiving, over a network from a client device, modification data describing changes to the game image, the modification data defined from user input received at the client device; applying the game image, the game state data, and the user input, by an image generation artificial intelligence (AI) to generate an AI generated image; transmitting the AI generated image over the network to the client device for rendering to a display.

20 Claims, 8 Drawing Sheets

(56) References Cited

U.S. PATENT DOCUMENTS

| | | | | |
|---|---|---|---|---|
| 2020/0238178 | A1* | 7/2020 | Lin | A63F 13/67 |
| 2021/0106912 | A1* | 4/2021 | Knowles | G06T 3/18 |
| 2021/0346806 | A1* | 11/2021 | Pardeshi | G06N 3/045 |
| 2022/0068037 | A1* | 3/2022 | Pardeshi | G06N 3/045 |
| 2022/0114698 | A1* | 4/2022 | Liu | G06T 3/04 |
| 2022/0249952 | A1* | 8/2022 | Qiu | A63F 13/35 |

* cited by examiner

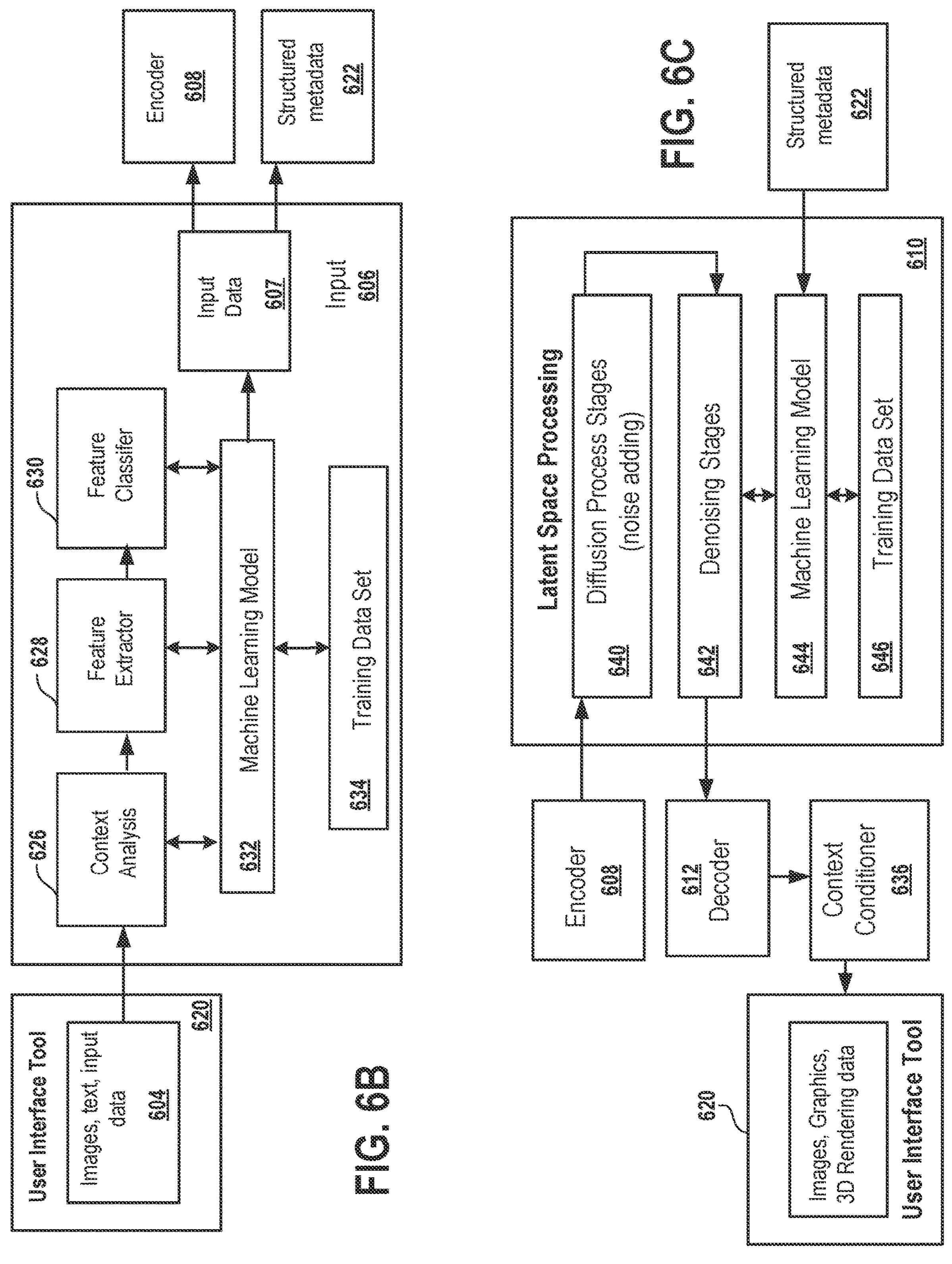
User Interface Tool
620
Images, text, input data
604
Context Analysis
626
Feature Extractor
628
Feature Classifer
630
Machine Learning Model
632
Training Data Set
634
Input Data
607
Input
606
Encoder
608
Structured metadata
622
FIG. 6B
FIG. 6C
Latent Space Processing
610
Diffusion Process Stages (noise adding)
640
Denoising Stages
642
Machine Learning Model
644
Training Data Set
646
Structured metadata
622
Encoder
608
612 Decoder
Context Conditioner
636
620
Images, Graphics, 3D Rendering data
User Interface Tool

USING GAME STATE DATA FOR SEMANTIC UNDERSTANDING BY AN AI IMAGE GENERATION MODEL

BACKGROUND

1. Field of the Disclosure

The present disclosure relates generally to methods, systems and devices for using game state data for semantic understanding by an AI image generation model, and a dynamic interface for providing feedback regarding output by an AI image generation model.

2. Description of the Related Art

The video game industry has seen many changes over the years. As technology advances, video games continue to achieve greater immersion through sophisticated graphics, realistic sounds, engaging soundtracks, haptics, etc. Players are able to enjoy immersive gaming experiences in which they participate and engage in virtual environments, and new ways of interaction are sought. Furthermore, players may stream video of their gameplay for spectating by spectators, enabling others to share in the gameplay experience.

It is in this context that implementations of the disclosure arise.

SUMMARY

Implementations of the present disclosure include methods, systems and devices for using game state data for semantic understanding by an AI image generation model, and a dynamic interface for providing feedback regarding output by an AI image generation model.

In some implementations, a method is provided, including: receiving a game image, said game image being captured from gameplay of a video game and said game image depicting a scene of the video game; receiving game state data describing attributes of the scene of the video game that is depicted in the game image; receiving, over a network from a client device, modification data describing changes to the game image, the modification data defined from user input received at the client device; applying the game image, the game state data, and the user input, by an image generation artificial intelligence (AI) to generate an AI generated image; transmitting the AI generated image over the network to the client device for rendering to a display.

In some implementations, the applying of the game state data enables a semantic understanding of the scene depicted in the game image by the image generation AI.

In some implementations, the semantic understanding of the scene is applied by the image generation AI to execute the changes described in the modification data.

In some implementations, the game state data identifies one or more elements in the scene that is depicted in the game image.

In some implementations, the game state data describes depths of one or more virtual objects in the scene.

In some implementations, the modification data describes a change in a location of a given virtual object within the scene, and wherein generating the AI generated image is configured to use the depths of the one or more virtual objects to execute the change in location of the given virtual object described by the modification data.

In some implementations, the modification data describes a placement of a given virtual object within the scene, and wherein generating the AI generated image is configured to use the depths of the one or more virtual objects to execute the placement of the given virtual object described by the modification data.

In some implementations, the depths of the one or more virtual objects is configured to enable proper occlusion of, or by, the one or more virtual objects when executing the changes described by the modification data.

In some implementations, the game state data describes three-dimensional structures of one or more virtual objects in the scene.

In some implementations, the modification data is defined by words or phrases generated by the user input received at the client device.

In some implementations, a non-transitory computer-readable medium having program instructions embodied thereon is provided, said program instructions being configured, when executed by at least one server computer, to cause said at least one server computer to perform a method including: receiving a game image, said game image being captured from gameplay of a video game and said game image depicting a scene of the video game; receiving game state data describing attributes of the scene of the video game that is depicted in the game image; receiving, over a network from a client device, modification data describing changes to the game image, the modification data defined from user input received at the client device; applying the game image, the game state data, and the user input, by an image generation artificial intelligence (AI) to generate an AI generated image; transmitting the AI generated image over the network to the client device for rendering to a display.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure may be better understood by reference to the following description taken in conjunction with the accompanying drawings in which:

FIGS. 6A, 6B, and 6C illustrate a general representation of an image generation AI (IGAI) processing sequence, in accordance with implementations of the disclosure.

DETAILED DESCRIPTION

The following implementations of the present disclosure provide methods, systems and devices for a dynamic interface for using game state data for semantic understanding by an AI image generation model, and providing feedback regarding output by an AI image generation model.

When an image is generated automatically by an AI model, responsive to user input, the resulting image may not be to the user's liking. In order to modify the image, or provide dynamic feedback to train the AI model to generate images consistent with the user's intent, a UI is dynamically generated for an image. The UI has selection interfaces that are dynamically locked to specific features shown in the image. For example, if a person is in the scene of the image that was generated, the user interface may automatically identify the person and suggest options to modify, and such feedback of the modification is returned to the AI model for training and subsequent generation of an additional image that is more consistent with the feedback. In one embodiment, images are broken down into layers, whereby the layers can be identified automatically by an AI analysis model. The layers can, for example, include backgrounds, foregrounds, mid-grounds, and isolation of specific objects in the image for selective modification or removal. In one embodiment, the feedback provided by the UI can enable the user to provide directions as to how the image should be modified. The modification can include not just the content, but also the angle at which the image is taken similar to the way a photographer is told to take a different image from a different perspective. This feedback is then processed by the AI model as training information to then generate a new image that is more consistent with the requested intent of the user. In some embodiments, the user's intent can itself be analyzed to provide a profile for the user, such as to identify preferences and likes of the user for making future modifications to automatically generated images.

With the above overview in mind, the following provides several example figures to facilitate understanding of the example embodiments.

Figure 1:
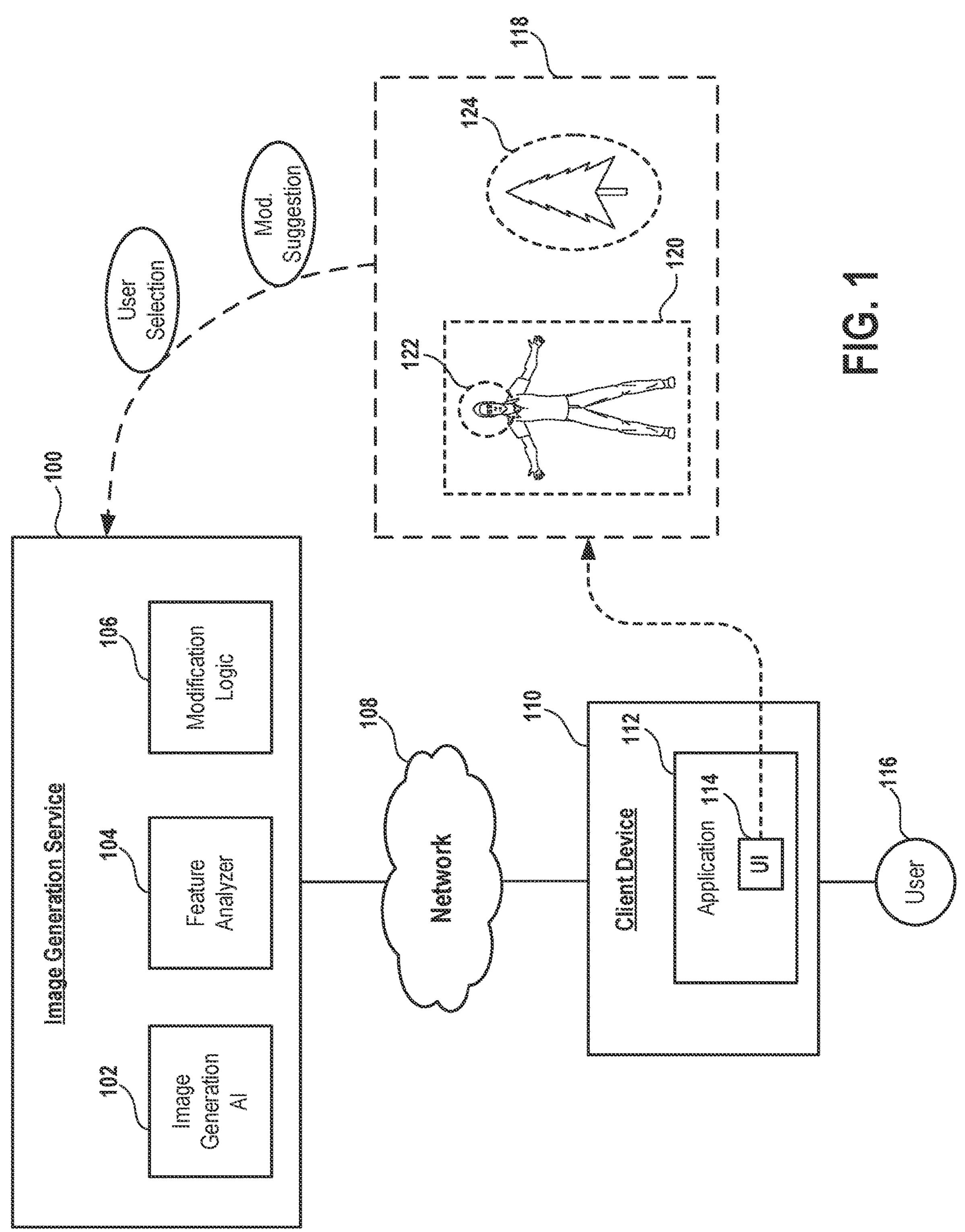
FIG. 1 conceptually illustrates an image generation service providing a user interface (UI) for modifying an image, in accordance with implementations of the disclosure.

FIG. 1 conceptually illustrates an image generation service providing a user interface (UI) for modifying an image, in accordance with implementations of the disclosure.

In the illustrated implementation, the image generation service 100 includes an image generation artificial intelligence 102 that is configured to generate images responsive to user input. The image generation service 100 is accessible over a network 108 (e.g. including the Internet) by a client device 100. By way of example without limitation, the client device 100 can be a personal computer, laptop, tablet, mobile device, cellular phone, game console, set-top box, streaming box, or any other type of computing device capable of performing the functions ascribed thereto in the present disclosure. The client device 110 executes an application 112 that accesses the image generation service 100 over the network 108. In some implementations, the application 112 is a web browser, and the image generation service 100 is accessible as a website on the Internet. In other implementations, the application 112 is a dedicated application or app executed by the client device that communicates with the image generation service 100, such as by accessing an application programming interface (API) exposed by the image generation service 100.

The application 112 renders a user interface 114, through which a user 116 interfaces with the image generation service 100. For example, through the user interface 114, the user 116 can provide user input such as descriptive text or images that are used by the image generation AI 102 to generate an image. It will be appreciated that when an image is generated automatically by the image generation AI 102, responsive to user input, the resulting image may not be to the user's liking. Thus, in order to modify the image, or provide dynamic feedback to train the image generation AI to generate images consistent with the user's intent, in some implementations, a modification UI is dynamically generated for an image and presented as part of the UI 114. In some implementations, the image generation service 100 further includes a feature analyzer 104 that is configured to analyze the image to identify features of the image that the user may wish to modify. For example, the feature analyzer 104 may identify various elements or objects within the image, and based on the identification, modification logic 106 determines possible modifications which can be suggested to the user via the modification UI. In some implementations, the feature analyzer 104 uses a recognition model to identify the features in the image.

In this manner, the modification UI can provide selection interfaces that are dynamically locked to specific features shown in the image. For example, if a person 120 is in the scene of an image 118 that was generated, the feature analyzer 104 may automatically identify the person 120 and the modification logic 106 may suggest options to modify, such as making the person taller, shorter, adjusting the person's clothing, etc. In some implementations, the system may identify the head 122 of the user and suggest specific modifications, such as changing the expression on the person's face, hair color, etc. In some implementations, the system may identify a tree 124 in the image 118, and suggest modifications such as making the tree shorter or taller, wider, more or less green, more or less foliage, with flowers, with fruit, etc.

In some implementations, a selection tool is provided in the modification UI whereby a user may identify a region of the image for modification, such as by drawing a box or encircling the region with a drawing tool or predefined shape tool, using a paintbrush tool to shade the region, etc. The feature analyzer 104 analyzes the identified region to determine the content of the region, and the modification logic 106 suggests modifications based on the identified content of the region.

The user 116 can accordingly select one or more suggested modifications. Additionally, the modification UI can enable the user 116 to enter additional modifications or directions for how to change the image, such as through entering text describing the additional modifications. The selected or entered modifications are returned to the image generation AI as feedback for training and subsequent generation of an additional image that is more consistent with the feedback.

In one embodiment, images are analyzed and broken down into layers, whereby the layers can be identified automatically by an AI analysis model. The layers can, for example, include backgrounds, foregrounds, mid-ground, and isolation of specific objects in the image for selective modification or removal. Hence the user can identify objects relative to their positioning in the scene, and issue modification commands using this information (e.g. move an object from the foreground to the background), or make modifications to entire regions of the scene, such as the background, foreground, mid-ground or any identified layer.

Additionally, in one embodiment, the modification can include not just the content, but also the angle at which the image is taken similar to the way a photographer is told to take a different image from a different perspective. For example, user input can include instructions to make the image from a different perspective or with different optics, such as closer, further away, rotated, lower, higher, overhead, left, right, wider/narrower angle, zoom, etc. This feedback is then processed by the image generation AI model as training information to then generate a new image that is more consistent with the requested intent of the user.

In some embodiments, the user's intent can itself be analyzed to provide a profile for the user, such as to identify preferences and likes of the user for making future modifications to automatically generated images.

Figure 2:
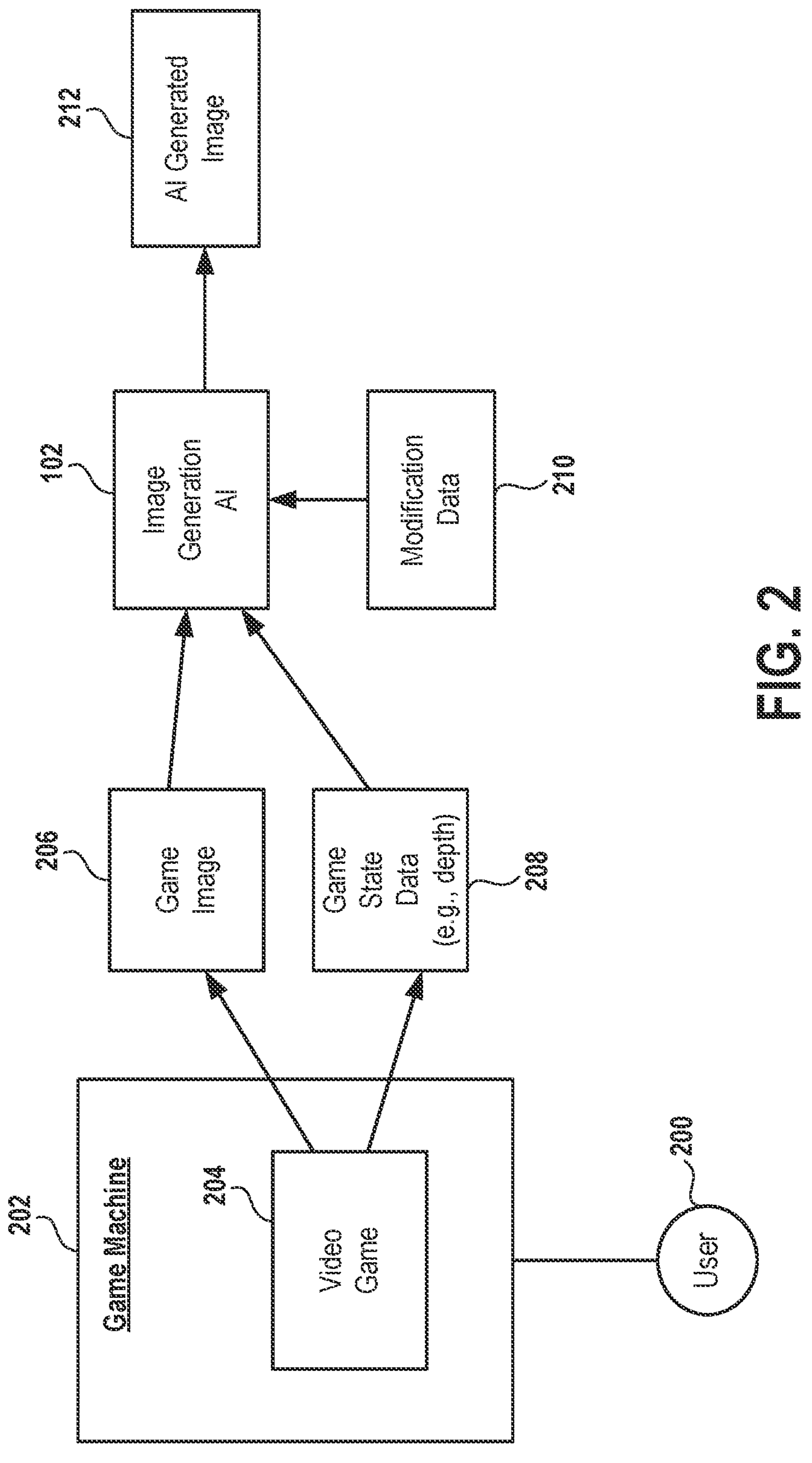
FIG. 2 conceptually illustrates generation of an image by an image generation AI based on a game image and related game state information, in accordance with implementations of the disclosure.

FIG. 2 conceptually illustrates generation of an image by an image generation AI based on a game image and related game state information, in accordance with implementations of the disclosure.

In some implementations, a user 200 that plays a video game 204 executed by a game machine 202 may capture a game image 206 from their gameplay. In a local gaming implementation, the game machine 202 is a local device (e.g. computer, game console, etc.), whereas in a cloud gaming implementation, the game machine 202 is a remote device such as a server computer/blade which executes the video game 204 and streams the gameplay video to the user's local client device (not shown). In some implementations, the game image 206 is a still image from the user's gameplay. In other implementations, the game image 206 can be a video clip from the user's gameplay.

The game image 206 can provided as input to the image generation AI 102 to generate an image. Further, the user may provide user input in the form of modification data 210 indicating how the user wishes to modify the game image 206 or otherwise use the game image 206 as a seed image for generating a new AI generated image 212. In some implementations, to provide further semantic understanding of content of the game image 206, game state data 208 is also provided as input to the image generation AI 102. The game state data 208 includes data describing the state of the virtual environment of the video game 204 at the time the game image 206 was taken during the gameplay.

It will be appreciated that the game state data 208 may describe various aspects of the scene depicted in the game image 206, such as identification of objects/elements, the depths of objects, movements of objects occurring in the scene, audio that was played at the time of the image capture, audio associated with specific objects, words spoken by a character, 3D structures of objects, information about occluded objects in the scene, lighting information, physics information, etc. By using such game state information as input for the image generation AI 102, this provides improved understanding of content of the game image, and consequently improved semantic understanding of user-described modifications/changes.

By way of example without limitation, the game state data 208 may include depth information about objects in the game image 206. The depth information thus enables an understanding of the relative positioning of objects in the scene in three dimensions. And accordingly, when the user modification data 210 includes user directions to move an object, such movement can be understood relative to other objects in three dimensions. For example, the user may input a statement such as "put a plant behind the couch," and accordingly, the image generation AI will understand the depth of the couch in the scene and place a plant in the correct depth relative to the couch and relative to the depths of other objects in the scene. Or if the user inputs a direction to move an object, the object can be moved and replaced at the correct depth relative to other objects or elements. For example, an instruction to "move that tree to the left" can be understood with correct depth information so that the movement and placement of the tree does not occlude a person walking a dog in the scene that is at a closer depth than the tree.

In related implementations, additional game state information can provide further improvements in the image generation. For example, by using information describing occluded objects or occluded portions of objects in the game image 206, then when an object is moved, the previously occluded objects or occluded portions can be revealed and included by the image generation AI 102 in the AI generated image 212. As another example, by using information describing the 3D structure of objects, then objects can be moved or placed while respecting the depth boundaries of other objects, e.g. so that an object won't appear too close in front of or behind another object in the scene. Thus, by providing additional semantic understanding of what is in the scene in the game image 206, the image generation AI 102 is better able to handle user prompts or input describing modifications or changes that the user wishes to make.

Figure 3:
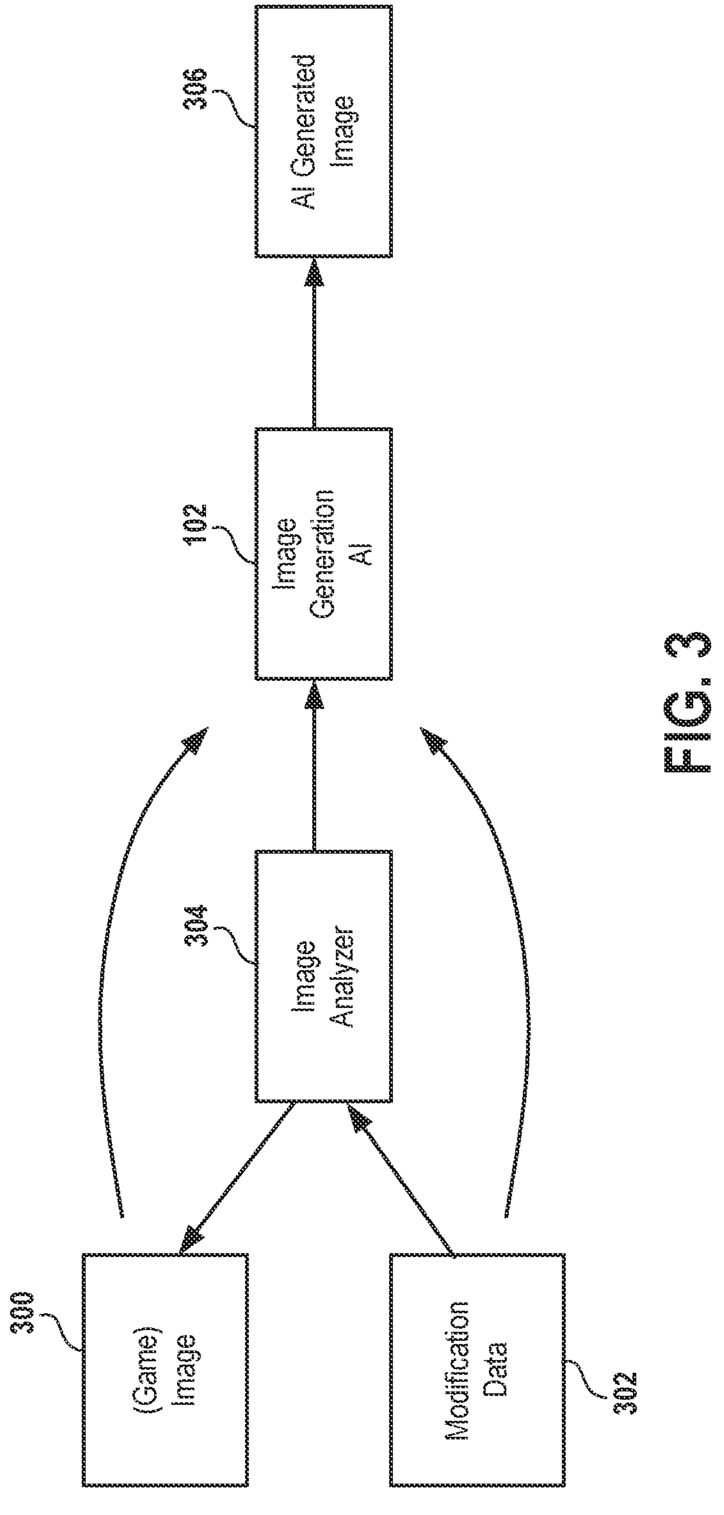
FIG. 3 conceptually illustrates extraction of features from a game-generated scene for use as input to an image generation AI, in accordance with implementations of the disclosure.

FIG. 3 conceptually illustrates extraction of features from a game-generated scene for use as input to an image generation AI, in accordance with implementations of the disclosure.

In some implementations, a game image 300 is provided in order to provide stylistic or artistic information for generation of an AI generated image 306 by the image generation AI 102. To facilitate understanding of stylistic/artistic elements of the game image 300, an image analyzer 304 is configured to analyze the game image 300 to determine stylistic/artistic elements of the game image 300. For example, in some implementations, the image analyzer 304 is configured analyze the lighting in the scene depicted in the game image 300, which can include analyzing sources of light, locations of light sources, color temperature, intensity, contrast, etc. In some implementations, the image analyzer 304 is configured to analyze other artistic aspects of the game image 300, such as the color palette employed, the types of lines delineating boundaries of objects, types of textures or shadings, etc.

The extracted artistic/stylistic information can be provided to the image generation AI 102 as additional input used to affect the generation of the AI generated image 306. For example, the modification data 302 may reference a stylistic element of the game image 300, and such a stylistic element can be determined by the image analyzer 304 and used as input for the image generation AI 306. For example, the modification data 302 may include an instruction to generate an image with lighting like the game image 300. The image analyzer 304 may analyze the lighting of the game image 300, and thereby generate lighting information describing the lighting of the game image 300, and such lighting information is used by the image generation AI to generate the AI generated image 306 so as to have similar lighting. In this example, the AI generated image 306 might have lighting of a similar color temperature, or similarly situated light sources, etc. to that of the game image 300.

In some implementations, the image analyzer 304 is triggered to analyze a given stylistic aspect of the game image 300 in response to a reference to such a stylistic aspect of the game image in the modification data. For example, in the above-described embodiment involving lighting, the image analyzer 304 can be triggered to analyze the lighting of the game image 300 in response to the user input indicating a reference to the lighting of the game image 300. In some implementations, the image analyzer 304 is a recognition model configured to recognize stylistic or artistic elements of an image.

In this manner, the game image 300 is used as a type of reference image providing stylistic input for purposes of generation of an image by the image generation AI 102. It will be appreciated that the user may not wish to simply make the AI generated image 306 wholly in the style of the game image 300, but rather wishes to apply only certain stylistic elements. Accordingly, the present implementations enable selective use of stylistic elements from the game image 300 to be applied for image generation, as specified through the modification data 302.

In some implementations, the image generation AI 102 generates the AI generated image 306 based on the input provided in the modification data 302, and incorporating stylistic elements from the game image 300 as presently described. In other implementations, the image generation AI 102 generates the AI generated image 306 using another image such as described previously, with the modification data 302 describing modifications/changes to the image, and incorporating stylistic elements from the game image 300 as presently described.

In some implementations, the image analyzer 304 can also analyze stylistic/artistic elements of the game image 300 using the above-described game state data and information.

While a game image 300 is described in the present embodiments, in other embodiments, other types of images can be utilized and analyzed for stylistic/artistic elements in accordance with implementations of the disclosure.

Figure 4:
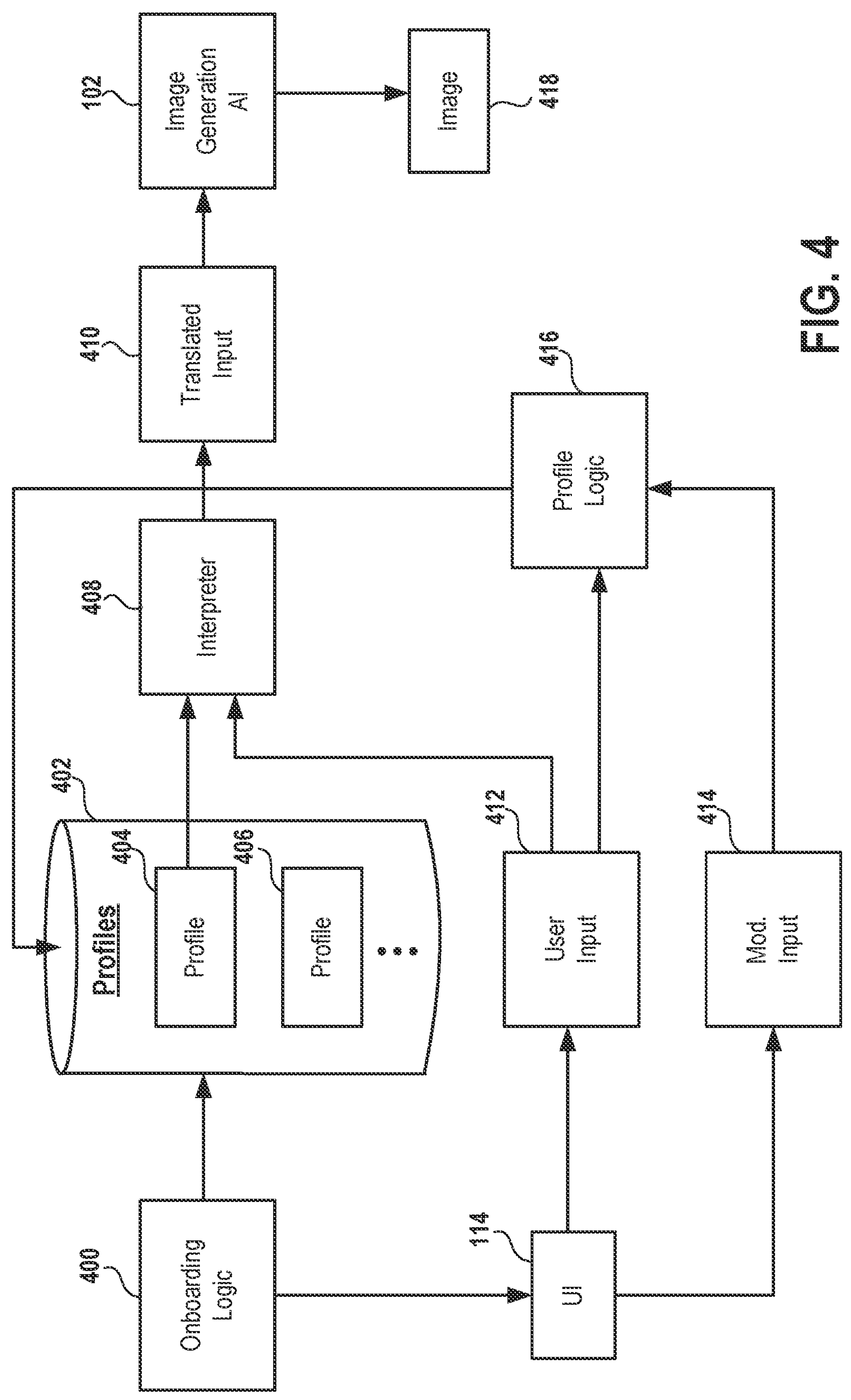
FIG. 4 conceptually illustrates a system for storing profiles for interpreting user input for AI image generation, in accordance with implementations of the disclosure.

FIG. 4 conceptually illustrates a system for storing profiles for interpreting user input for AI image generation, in accordance with implementations of the disclosure.

In some implementations, the system is configured to learn the user's understanding and intent with words used as input for the image generation AI 102. This understanding can define a profile for the user that is used to interpret the user's input words. In the illustrated implementation, a profiles storage 402 is provided, to which user profiles are stored. It will be appreciated that a given user may have more than one profile, such as profile 404 and profile 406, to enable different understandings of the user's intent to be used. It will be appreciated that the user may wish to create different profiles to facilitate generation of images with different styles or elements, based on different learned understandings of user preferences associated with the different profiles. In some implementations, a given profile maps words to one or more other words and/or data defining a semantic understanding of words as determined for the specific profile.

In some implementations, onboarding logic 400 is configured to provide an onboarding process where the user may indicate their preferred usage or understanding of certain words. For example, in some implementations, the onboarding logic 400 presents through the UI 114 a plurality of images, and the user may be asked to describe the images, or the user may be asked to associate images to certain predefined terms as understood by the user, and in this manner, the user's understanding of language used to describe images can be learned. In some implementations, the user's description or indication of their understanding of the images is mapped to known input words or phrases that were used to generate the images. This learned information about the user's preference or understanding regarding usage of words or phrases is stored to a given profile such as the profile 404 in the illustrated implementation. It will be appreciated that the onboarding logic 400 is useful for initial setup of a given profile, but may also be used at any time as a training tool to provide explicit training on the user's understanding and intent with respect to words and images.

Then, when the user enter's user input 412 to generate an image, such input is processed by an interpreter 408 based on a currently active profile 404 in the illustrated implementation, and the user input 412 is interpreted based on the profile 404. In some implementations, the profile 404 is used by the interpreter 408 to translate the user input 412 into translated input 410 that is fed to the image generation AI 102. For example, in some implementations, the profile 404 is used to map words or phrases found in the user input 412 to other words or phrases, which are thereby included in the translated input 410. For example, the user input 412 might include the word "dark," and based on the user's active profile 404, the word "dark" is mapped to additional words/phrases such as "fantasy," "H. R. Giger," etc., and thus the interpreter generates the translated input 410 to include one or more of these additional words/phrases.

It will be appreciated that as many words or phrases are subjective or open to interpretation, the profiles of the present implementations provide a way to learn, store, and apply the user's subjective understanding of the meaning of such words or phrases, so as to achieve results from the image generation AI 102 that better align with the user's expectations. Additionally, the user's profile can be further learned through usage of the system over time. For example, profile logic 416 can be configured analyze the user input 412, and may associate words/phrases used by the user with their profile, such as words which are used repeatedly by the user, or which are clustered or tend to be used in combination by the user, etc.

In some implementations, the user provides modification input 414 in response to a generated image 418 from the image generation AI 102. The modification input 414, as described above, may indicate changes the user wishes to make to the image 418, and can provide insight into the user's original intent with the original user input 412 used to generate the image 418. Thus, in some implementations, the profile logic 416 analyzes the modification input 414 to further determine the user's understanding of words supplied in the user input 412, and this understanding is stored to the active profile 404. For example, in some implementations, words provided in the modification input 414 may be mapped or associated to words provided in the user input 412, and such is stored to the active profile 404.

In some implementations, the system can be configured to suggest words or phrases at the time the user is generating their user input 412. In some implementations, in response to a given word or phrase provided by the user, then multiple possible related words or phrases are suggested, and the user may select one or more of the suggestions. Based on the user's selections in such instances, the user's active profile 404 can be updated over time, such as by associating or mapping words to each other based on such selections.

In some implementations, a given profile can define a learning model that is trained to predict or infer the user's preferred words/phrases based on a given supplied word or phrase. The learning model is trained using any of the presently described techniques and data describing the user's understanding of words, terminology, phrases, etc. In some implementations, the learning model is configured to associate or map or cluster various words or phrases, and these associations are strengthened or weakened as a result of training over time. The trained learning model is used by the interpreter 408 to generate predicted words based on the user input 412, which can be appended to the user input 412 or otherwise included to generate the translated input 410 that is fed to the image generation AI 102.

In some implementations, a given profile is configured to calibrate terms of degree when used by a user. For example, one user's usage of the term "tall" might be equivalent to "really tall" as applied by the image generation AI 102 to achieve a preferred result for the user. And thus, the profile systems of the present implementations can be configured to learn the user's preferences in this regard.

In some implementations, additional signals can be used by the profile logic 416 to further refine a given profile. For example, in some implementations, the image generation AI 102 may generate multiple images based on a given user input, and the user may select which one most closely matches what they intended. Such selection by the user can be used as feedback to adjust the user's profile. In further implementations, selection of additional features following image generation such as choosing an image to upscale, or re-running the image generation based on a given selected image, etc. can also be used as feedback.

It will be appreciated that a challenge in using image generation AI systems is that users struggle to provide the right input that achieves the result they desire. Thus, by implementing systems which learn the preferences and understanding of the user with respect to input terminology, users are able to more efficiently achieve improved image generation.

In some implementations, a theme can be defined for a given user or a given profile. The theme can be configured to define a particular style, and accordingly include certain words/phrases or other types of acceptable input that when applied to the image generation AI, will cause the image generation AI to generate an image in the particular style. In some implementations, the theme is editable so that the user may specify particular words/phrases or other particular input to be part of the theme's definition. Then, when user input is entered to generate an image, the theme is applied by appending the words/phrases/input which are stored to the theme.

Figure 5:
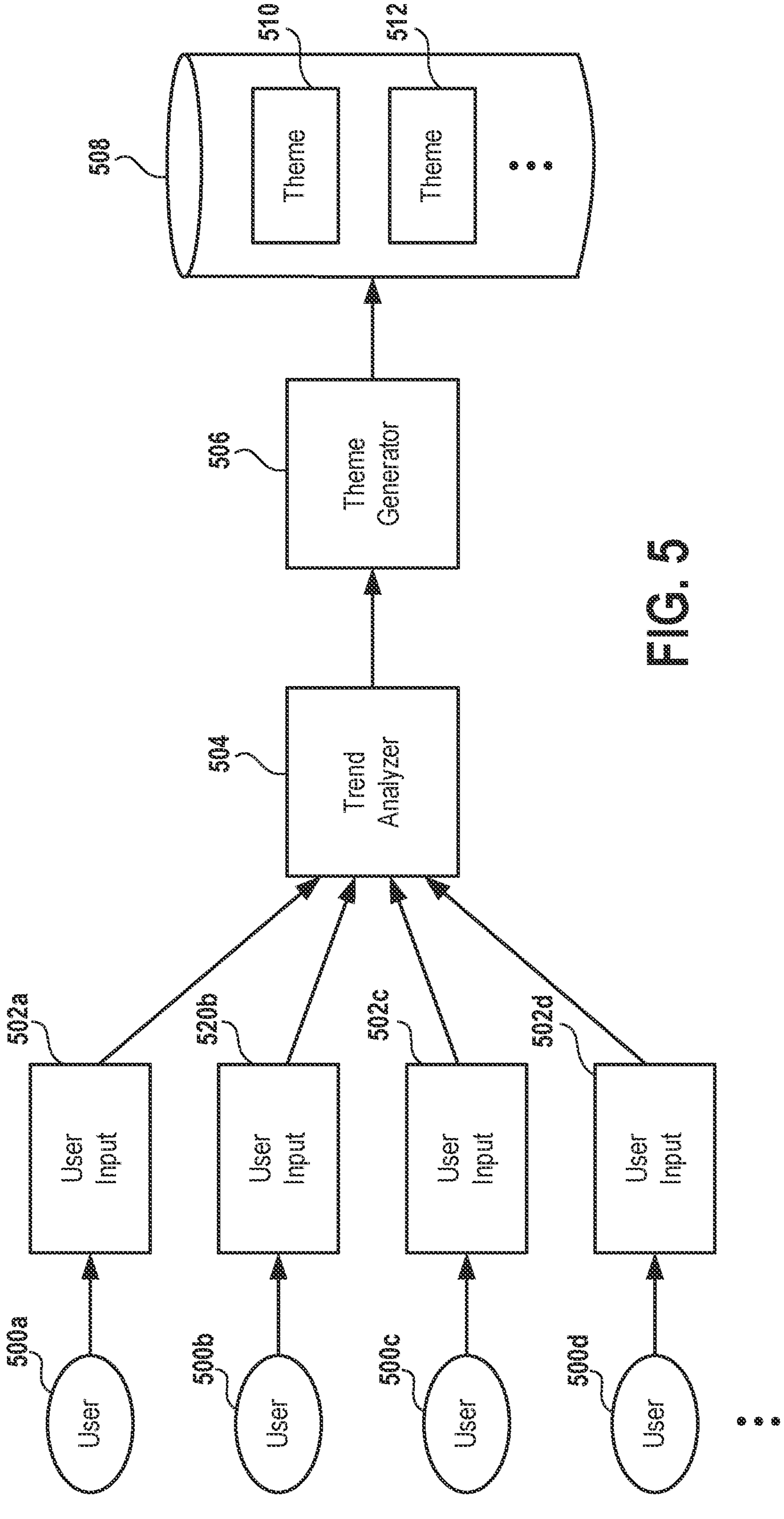
FIG. 5 conceptually illustrates crowdsourcing themes for image generation by an image generation AI, in accordance with implementations of the disclosure.

FIG. 5 conceptually illustrates crowdsourcing themes for image generation by an image generation AI, in accordance with implementations of the disclosure.

In some implementations, trends or popular inputs used for image generation by an image generation AI are determined and used to crowdsource themes which can be applied by subsequent users of the image generation AI. In the illustrated implementation, various users 500*a*, 500*b*, 500*c*, 500*d*, etc. respectively generate user inputs 502*a*, 502*b*, 502*c*, 502*d*, etc. The user inputs are provided for the purpose of generating an image by an image generation AI as has been described.

In some implementations, the user inputs are analyzed by a trend analyzer 504, which identifies popular or trending inputs based on the user inputs. For example, the trend analyzer 504 may identify popular or trending words, terms, phrases, or other inputs which are being input by the users of the system. Based on these trending inputs, a theme generator 506 is configured to generate one or more themes which include or are otherwise defined by a set of popular or trending inputs. For example, a given theme may be defined to include a specific collection of words which tend to be used together by users.

It will be appreciated that by analyzing input terms across many users, certain associations amongst various input terms may be discovered that might not otherwise be apparent. For example, some words that might not seem to be related to each other may be found to occur in conjunction with each other in user inputs with a high degree of regularity.

It will be appreciated that there can be a library of themes, such as themes 510, 512, etc. stored to a theme storage 508, from which a user may select a given theme to apply for their image generation instance. By implementing selectable themes in accordance with implementations of the disclosure, users are able to more quickly generate an image having a particular style or look.

In one embodiment, the generation of an output image, graphics, and/or three-dimensional representation by an image generation AI (IGAI), can include one or more artificial intelligence processing engines and/or models. In general, an AI model is generated using training data from a data set. The data set selected for training can be custom curated for specific desired outputs and in some cases the training data set can include wide ranging generic data that can be consumed from a multitude of sources over the Internet. By way of example, an IGAI could have access to a vast amount of data, e.g., images, videos and three-dimensional data. The generic data is used by the IGAI to gain understanding of the type of content desired by an input. For instance, if the input is requesting the generation of a tiger in the Sahara desert, the data set should have various images of tigers and deserts to access and draw upon during the processing of an output image. The curated data set, on the other hand, may be more specific to a type of content, e.g., video game related art, videos and other asset related content. Even more specifically, the curated data set could include images related to specific scenes of a game or action sequences including game assets, e.g., unique avatar characters and the like. As described above, an IGAI can be customized to enable entry of unique descriptive language statements to set a style for the requested output images or content. The descriptive language statements can be text or other sensory input, e.g., inertial sensor data, input speed, emphasis statements, and other data that can be formed into an input request. The IGAI can also be provided images, videos, or sets of images to define the context of an input request. In one embodiment, the input can be text describing a desired output along with an image or images to convey the desired contextual scene being requested as the output.

In one embodiment, an IGAI is provided to enable text-to-image generation. Image generation is configured to implement latent diffusion processing, in a latent space, to synthesize the text to image processing. In one embodiment, a conditioning process assists in shaping the output toward the desired output, e.g., using structured metadata. The structured metadata may include information gained from the user input to guide a machine learning model to denoise progressively in stages using crosssattention until the processed denoising is decoded back to a pixel space. In the decoding stage, upscaling is applied to achieve an image, video, or 3D asset that is of higher quality. The IGAI is therefore a custom tool that is engineered to process specific types of input and render specific types of outputs. When the IGAI is customized, the machine learning and deep learning algorithms are tuned to achieve specific custom outputs, e.g., such as unique image assets to be used in gaming technology, specific game titles, and/or movies.

In another configuration, the IGAI can be a third-party processor, e.g., such as one provided by Stable Diffusion or others, such as OpenAI's GLIDE, DALL-E, MidJourney or Imagen. In some configurations, the IGAI can be used online via one or more Application Programming Interface (API) calls. It should be understood that reference to available IGAI is only for informational reference. For additional information related to IGAI technology, reference may be made to a paper published by Ludwig Maximilian University of Munich titled "*High-Resolution Image Synthesis with Latent Diffusion Models*", by Robin Rombach, et al., pp. 1-45. This paper is incorporated by reference.

Figure 6A:
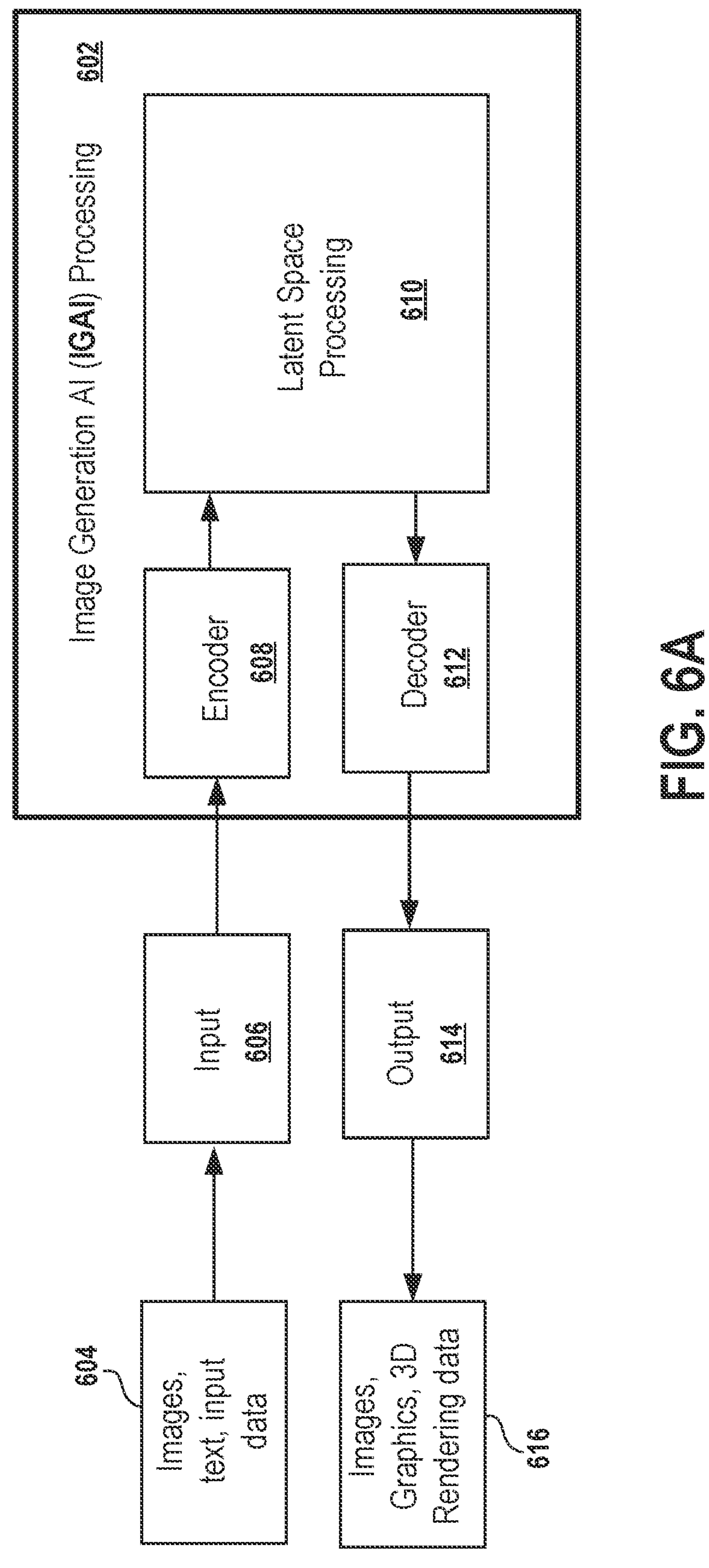

FIG. 6A is a general representation of an image generation AI (IGAI) 602 processing sequence, in accordance with one embodiment. As shown, input 606 is configured to receive input in the form of data, e.g., text description having semantic description or key words. The text description can in the form of a sentence, e.g., having at least a noun and a verb. The text description can also be in the form of a fragment or simply one word. The text can also be in the form of multiple sentences, which describe a scene or some action or some characteristic. In some configuration, the input text can also be input in a specific order so as to influence the focus on one word over others or even deemphasize words, letters or statements. Still further, the text input can be in any form, including characters, emojis, icons, foreign language characters (e.g., Japanese, Chinese, Korean, etc.). In one embodiment, text description is enabled by contrastive learning. The basic idea is to embed both an image and text in a latent space so that text corresponding to an image maps to the same area in the latent space as the image. This abstracts out the structure of what it means to be a dog for instance from both the visual and textual representation. In one embodiment, a goal of contrastive representation learning is to learn an embedding space in which similar sample pairs stay close to each other while dissimilar ones are far apart. Contrastive learning can be applied to both supervised and unsupervised settings. When working with unsupervised data, contrastive learning is one of the most powerful approaches in self-supervised learning.

In addition to text, the input can also include other content, e.g., such as images or even images that have descriptive content themselves. Images can be interpreted using image analysis to identify objects, colors, intent, characteristics, shades, textures, three-dimensional representations, depth data, and combinations thereof. Broadly speaking, the input 606 is configured to convey the intent of the user that wishes to utilize the IGAI to generate some digital content. In the context of game technology, the target content to be generated can be a game asset for use in a specific game scene. In such a scenario, the data set used to train the IGAI and input 606 can be used to customized the way artificial intelligence, e.g., deep neural networks, process the data to steer and tune the desired output image, data or three-dimensional digital asset.

The input 606 is then passed to the IGAI, where an encoder 608 takes input data and/or pixel space data and coverts into latent space data. The concept of "latent space" is at the core of deep learning, since feature data is reduced to simplified data representations for the purpose of finding patterns and using the patterns. The latent space processing 610 is therefore executed on compressed data, which significantly reduces the processing overhead as compared to processing learning algorithms in the pixel space, which is much more resource heavy and would require significantly more processing power and time to analyze and produce a desired image. The latent space is simply a representation of compressed data in which similar data points are closer together in space. In the latent space, the processing is configured to learn relationships between learned data points that a machine learning system has been able to derive from the information that it gets fed, e.g., the data set used to train the IGAI. In latent space processing 610, a diffusion process is computed using diffusion models. Latent diffusion models rely on autoencoders to learn lower-dimension representations of a pixel space. The latent representation is passed through the diffusion process to add noise at each step, e.g., multiple stages. Then, the output is fed into a denoising network based on a U-Net architecture that has cross-attention layers. A conditioning process is also applied to guide a machine learning model to remove noise and arrive at an image that represents something close to what was requested via user input. A decoder 612 then transforms a resulting output from the latent space back to the pixel space. The output 614 may then be processed to improve the resolution. The output 614 is then passed out as the result, which may be an image, graphics, 3D data, or data that can be rendered to a physical form or digital form.

FIG. 6B illustrates, in one embodiment, additional processing that may be done to the input 606. A user interface tool 620 may be used to enable a user to provide an input request 604. The input request 604, as discussed above, may be images, text, structured text, or generally data. In one embodiment, before the input request is provided to the encoder 608, the input can be processed by a machine learning process that generates a machine learning model 632, and learns from a training data set 634. By way of example, the input data may be processed via a context analyzer 626 to understand the context of the request. For example, if the input is "space rockets for flying to mars", the input can be analyzed by the context analyzer 626 to determine that the context is related to outer space and planets. The context analysis may use machine learning model 632 and training data set 634 to find related images for this context or identify specific libraries of art, images or video. If the input request also includes an image of a rocket, the feature extractor 628 can function to automatically identify feature characteristics in the rocket image, e.g., fuel tank, length, color, position, edges, lettering, flames, etc. A feature classifier 630 can also be used to classify the features and improve the machine learning model 632. In one embodiment, the input data 607 can be generated to produce structured information that can be encoded by encoder 608 into the latent space. Additionally, it is possible to extract out structured metadata 622 from the input request. The structed metadata 622 may be, for example, descriptive text used to instruct the IGAI 602 to make a modification to a characteristic or change to the input images or changes to colors, textures, or combinations thereof. For example, the input request 604 could include an image of the rocket, and the text can say "make the rocket wider" or "add more flames" or "make it stronger" or some other modifier intended by the user (e.g., semantically provided and context analyzed). The structured metadata 622 can then be used in subsequent latent space processing to tune the output to move toward the user's intent. In one embodiment, the structured metadata may be in the form of semantic maps, text, images, or data that is engineered to represent the user's intent as to what changes or modifications should be made to an input image or content.

FIG. 6C illustrates how the output of the encoder 608 is then fed into latent space processing 610, in accordance with one embodiment. A diffusion process is executed by diffusion process stages 640, wherein the input is processed through a number of stages to add noise to the input image or images associated with the input text. This is a progressive process, where at each stage, e.g., 10-50 or more stages, noise is added. Next, a denoising process is executed through denoising stages 642. Similar to the noise stages, a reverse process is executed where noise is removed progressively at each stage, and at each stage, machine learning is used to predict what the output image or content should be, in light of the input request intent. In one embodiment, the structured metadata 622 can be used by a machine learning model 644 at each stage of denoising, to predict how the resulting denoised image should look and how it should be modified. During these predictions, the machine learning model 644 uses the training data set 646 and the structured metadata 622, to move closer and closer to an output that most resembles that requested in the input. In one embodiment, during the denoising, a U-Net architecture that has cross-attention layers may be used, to improve the predictions. After the final denoising stage, the output is provided to a decoder 612 that transforms that output to the pixel space. In one embodiment, the output is also upscaled to improve the resolution. The output of the decoder, in one embodiment, can be optionally run through a context conditioner 636. The context conditioner is a process that may use machine learning to examine the resulting output to make adjustments to make the output more realistic or remove unreal or unnatural outputs. For example, if the input asks for "a boy pushing a lawnmower" and the output shows a boy with three legs, then the context conditioner can make adjustments with in-painting processes or overlays to correct or block the inconsistent or undesired outputs. However, as the machine learning model 644 gets smarter with more training over time, there will be less need for a context conditioner 636 before the output is rendered in the user interface tool 620.

Figure 7:
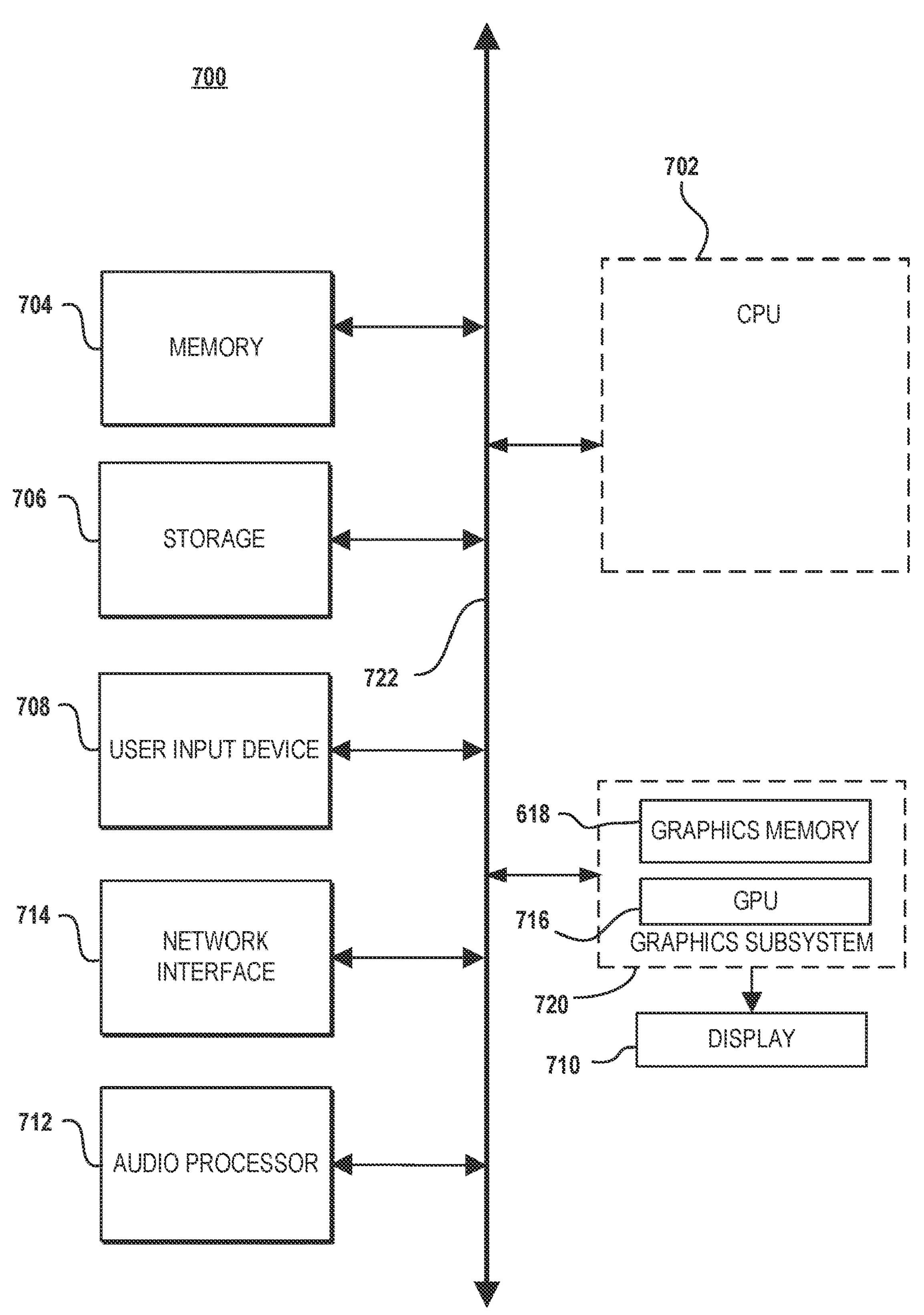
FIG. 7 illustrates components of an example device that can be used to perform aspects of the various embodiments of the present disclosure.

FIG. 7 illustrates components of an example device 700 that can be used to perform aspects of the various embodiments of the present disclosure. This block diagram illustrates a device 700 that can incorporate or can be a personal computer, video game console, personal digital assistant, a server or other digital device, suitable for practicing an embodiment of the disclosure. Device 700 includes a central processing unit (CPU) 702 for running software applications and optionally an operating system. CPU 702 may be comprised of one or more homogeneous or heterogeneous processing cores. For example, CPU 702 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. Device 700 may be a localized to a player playing a game segment (e.g., game console), or remote from the player (e.g., back-end server processor), or one of many servers using virtualization in a game cloud system for remote streaming of gameplay to clients.

Memory 704 stores applications and data for use by the CPU 702. Storage 706 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 708 communicate user inputs from one or more users to device 700, examples of which may include keyboards, mice, joysticks, touch pads, touch screens, still or video recorders/cameras, tracking devices for recognizing gestures, and/or microphones. Network interface 714 allows device 700 to communicate with other computer systems via an electronic communications network, and may include wired or wireless communication over local area networks and wide area networks such as the internet. An audio processor 712 is adapted to generate analog or digital audio output from instructions and/or data provided by the CPU 702, memory 704, and/or storage 706. The components of device 700, including CPU 702, memory 704, data storage 706, user input devices 708, network interface 710, and audio processor 712 are connected via one or more data buses 722.

A graphics subsystem 720 is further connected with data bus 722 and the components of the device 700. The graphics subsystem 720 includes a graphics processing unit (GPU) 716 and graphics memory 718. Graphics memory 718 includes a display memory (e.g., a frame buffer) used for storing pixel data for each pixel of an output image. Graphics memory 718 can be integrated in the same device as GPU 708, connected as a separate device with GPU 716, and/or implemented within memory 704. Pixel data can be provided to graphics memory 718 directly from the CPU 702. Alternatively, CPU 702 provides the GPU 716 with data and/or instructions defining the desired output images, from which the GPU 716 generates the pixel data of one or more output images. The data and/or instructions defining the desired output images can be stored in memory 704 and/or graphics memory 718. In an embodiment, the GPU 716 includes 3D rendering capabilities for generating pixel data for output images from instructions and data defining the geometry, lighting, shading, texturing, motion, and/or camera parameters for a scene. The GPU 716 can further include one or more programmable execution units capable of executing shader programs.

The graphics subsystem 714 periodically outputs pixel data for an image from graphics memory 718 to be displayed on display device 710. Display device 710 can be any device capable of displaying visual information in response to a signal from the device 700, including CRT, LCD, plasma, and OLED displays. Device 700 can provide the display device 710 with an analog or digital signal, for example.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the operations may be a server unit, a virtual machine, or a container, depending on the needs of each game engine segment. For example, if a game engine segment is responsible for camera transformations, that particular game engine segment may be provisioned with a virtual machine associated with a graphics processing unit (GPU) since it will be doing a large number of relatively simple mathematical operations (e.g., matrix transformations). Other game engine segments that require fewer but more complex operations may be provisioned with a processing entity associated with one or more higher power central processing units (CPUs).

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet. It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g., prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g., accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g., feedback data) from the client device or directly from the cloud gaming server.

In one embodiment, the various technical examples can be implemented using a virtual environment via a head-mounted display (HMD). An HMD may also be referred to as a virtual reality (VR) headset. As used herein, the term "virtual reality" (VR) generally refers to user interaction with a virtual space/environment that involves viewing the virtual space through an HMD (or VR headset) in a manner that is responsive in real-time to the movements of the HMD (as controlled by the user) to provide the sensation to the user of being in the virtual space or metaverse. For example, the user may see a three-dimensional (3D) view of the virtual space when facing in a given direction, and when the user turns to a side and thereby turns the HMD likewise, then the view to that side in the virtual space is rendered on the HMD. An HMD can be worn in a manner similar to glasses, goggles, or a helmet, and is configured to display a video game or other metaverse content to the user. The HMD can provide a very immersive experience to the user by virtue of its provision of display mechanisms in close proximity to the user's eyes. Thus, the HMD can provide display regions to each of the user's eyes which occupy large portions or even the entirety of the field of view of the user, and may also provide viewing with three-dimensional depth and perspective.

In one embodiment, the HMD may include a gaze tracking camera that is configured to capture images of the eyes of the user while the user interacts with the VR scenes. The gaze information captured by the gaze tracking camera(s) may include information related to the gaze direction of the user and the specific virtual objects and content items in the VR scene that the user is focused on or is interested in interacting with. Accordingly, based on the gaze direction of the user, the system may detect specific virtual objects and content items that may be of potential focus to the user where the user has an interest in interacting and engaging with, e.g., game characters, game objects, game items, etc.

In some embodiments, the HMD may include an externally facing camera(s) that is configured to capture images of the real-world space of the user such as the body movements of the user and any real-world objects that may be located in the real-world space. In some embodiments, the images captured by the externally facing camera can be analyzed to determine the location/orientation of the real-world objects relative to the HMD. Using the known location/orientation of the HMD the real-world objects, and inertial sensor data from the, the gestures and movements of the user can be continuously monitored and tracked during the user's interaction with the VR scenes. For example, while interacting with the scenes in the game, the user may make various gestures such as pointing and walking toward a particular content item in the scene. In one embodiment, the gestures can be tracked and processed by the system to generate a prediction of interaction with the particular content item in the game scene. In some embodiments, machine learning may be used to facilitate or assist in said prediction.

During HMD use, various kinds of single-handed, as well as two-handed controllers can be used. In some implementations, the controllers themselves can be tracked by tracking lights included in the controllers, or tracking of shapes, sensors, and inertial data associated with the controllers. Using these various types of controllers, or even simply hand gestures that are made and captured by one or more cameras, it is possible to interface, control, maneuver, interact with, and participate in the virtual reality environment or metaverse rendered on an HMD. In some cases, the HMD can be wirelessly connected to a cloud computing and gaming system over a network. In one embodiment, the cloud computing and gaming system maintains and executes the video game being played by the user. In some embodiments, the cloud computing and gaming system is configured to receive inputs from the HMD and the interface objects over the network. The cloud computing and gaming system is configured to process the inputs to affect the game state of the executing video game. The output from the executing video game, such as video data, audio data, and haptic feedback data, is transmitted to the HMD and the interface objects. In other implementations, the HMD may communicate with the cloud computing and gaming system wirelessly through alternative mechanisms or channels such as a cellular network.

Additionally, though implementations in the present disclosure may be described with reference to a head-mounted display, it will be appreciated that in other implementations, non-head mounted displays may be substituted, including without limitation, portable device screens (e.g. tablet, smartphone, laptop, etc.) or any other type of display that can be configured to render video and/or provide for display of an interactive scene or virtual environment in accordance with the present implementations. It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states and are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

In one embodiment, the video game is executed either locally on a gaming machine, a personal computer, or on a server. In some cases, the video game is executed by one or more servers of a data center. When the video game is executed, some instances of the video game may be a simulation of the video game. For example, the video game may be executed by an environment or server that generates a simulation of the video game. The simulation, on some embodiments, is an instance of the video game. In other embodiments, the simulation maybe produced by an emulator. In either case, if the video game is represented as a simulation, that simulation is capable of being executed to render interactive content that can be interactively streamed, executed, and/or controlled by user input.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

The invention claimed is:

1. A method, comprising:

receiving a game image, said game image being captured from gameplay of a video game and said game image depicting a scene of the video game;

receiving game state data describing attributes of the scene of the video game that is depicted in the game image;

generating, based in part on at least one feature shown in the game image, a user interface suggesting at least one modification to the at least one feature;

receiving, over a network from a client device, at least one modification data describing changes to the game image, the at least one modification data defined from a user input received at the client device;

applying the game image, the game state data, and the user input, by an image generation tool to generate a first image; and transmitting the first image over the network to the client device for rendering to a display.

2. The method of claim 1, wherein the applying of the game state data enables a semantic understanding of the scene depicted in the game image by the image generation tool.

3. The method of claim 2, wherein the semantic understanding of the scene is applied by the image generation tool to execute the changes described in the at least one modification data.

4. The method of claim 1, wherein the game state data identifies one or more elements in the scene that is depicted in the game image.

5. The method of claim 1, wherein the game state data describes depths of one or more virtual objects in the scene.

6. The method of claim 5, wherein the at least one modification data describes a change in a location of a given virtual object within the scene, and wherein the first image is generated based in part on the depths of the one or more virtual objects to determine the change in location of the given virtual object described by the at least one modification data.

7. The method of claim 5, wherein the at least one modification data describes a placement of a given virtual object within the scene, and wherein the first image is generated based in part on the depths of the one or more virtual objects to determine the placement of the given virtual object described by the at least one modification data.

8. The method of claim 5, wherein the depths of the one or more virtual objects is configured to enable proper occlusion of, or by, the one or more virtual objects when executing the changes described by the at least one modification data.

9. The method of claim 1, wherein the game state data describes three-dimensional structures of one or more virtual objects in the scene.

10. A non-transitory computer-readable medium having program instructions embodied thereon, said program instructions being configured, when executed by at least one server computer, to cause said at least one server computer to perform a method including:

receiving a game image, said game image being captured from gameplay of a video game and said game image depicting a scene of the video game;

receiving game state data describing attributes of the scene of the video game that is depicted in the game image;

generating, based in part on at least one feature shown in the game image, a user interface suggesting at least one modification to the at least one feature;

receiving, over a network from a client device, at least one modification data describing changes to the game image, the at least one modification data defined from a user input received at the client device;

applying the game image, the game state data, and the user input, by an image generation tool to generate a first image; and transmitting the first image over the network to the client device for rendering to a display.

11. The non-transitory computer-readable medium of claim 10, wherein the applying of the game state data enables a semantic understanding of the scene depicted in the game image by the image generation tool.

12. The non-transitory computer-readable medium of claim 11, wherein the semantic understanding of the scene is applied by the image generation tool to execute the changes described in the at least one modification data.

13. The non-transitory computer-readable medium of claim 10, wherein the game state data identifies one or more elements in the scene that is depicted in the game image.

14. The non-transitory computer-readable medium of claim 10, wherein the game state data describes depths of one or more virtual objects in the scene.

15. The non-transitory computer-readable medium of claim 14, wherein the at least one modification data describes a change in a location of a given virtual object within the scene, and wherein the first image is generated based in part on the depths of the one or more virtual objects to determine the change in location of the given virtual object described by the at least one modification data.

16. The non-transitory computer-readable medium of claim 14, wherein the at least one modification data describes a placement of a given virtual object within the scene, and wherein the first image is based in part on the depths of the one or more virtual objects to determine the placement of the given virtual object described by the at least one modification data.

17. The non-transitory computer-readable medium of claim 14, wherein the depths of the one or more virtual objects is configured to enable proper occlusion of, or by, the one or more virtual objects when executing the changes described by the at least one modification data.

18. The non-transitory computer-readable medium of claim 10, wherein the game state data describes three-dimensional structures of one or more virtual objects in the scene.

19. The non-transitory computer-readable medium of claim 10, wherein the at least one modification data is defined by words or phrases generated by the user input received at the client device.

20. The method of claim 1, further comprising:

identifying, from a plurality of modification data, a modification preference;

storing the modification preference in a user profile; and generating at least one modification based in part on the modification preference.

* * * * *